United States Patent
Beaurepaire et al.

(10) Patent No.: US 10,102,758 B1
(45) Date of Patent: Oct. 16, 2018

(54) METHOD AND APPARATUS FOR PRIVACY-SENSITIVE ROUTING OF AN AERIAL DRONE

(71) Applicant: HERE GLOBAL B.V., Eindhoven (NL)

(72) Inventors: Jerome Beaurepaire, Berlin (DE); Marko Tuukkanen, Schlenzer (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/584,810

(22) Filed: May 2, 2017

(51) Int. Cl.
| | |
|---|---|
| *G01C 21/00* | (2006.01) |
| *G08G 5/00* | (2006.01) |
| *B64C 39/02* | (2006.01) |
| *G06Q 10/08* | (2012.01) |
| *G05D 1/10* | (2006.01) |

(52) U.S. Cl.
CPC ......... *G08G 5/0069* (2013.01); *B64C 39/024* (2013.01); *G06Q 10/08355* (2013.01); *G08G 5/0039* (2013.01); *B64C 2201/128* (2013.01); *G05D 1/101* (2013.01)

(58) Field of Classification Search
None
See application file for complete search history.

(56) References Cited

U.S. PATENT DOCUMENTS

| | | | |
|---|---|---|---|
| 2014/0316614 A1 | 10/2014 | Newman | |
| 2015/0371543 A1* | 12/2015 | Amodio Leon | G08G 5/0034 701/528 |
| 2016/0012730 A1 | 1/2016 | Jarrell | |
| 2016/0224932 A1 | 8/2016 | Shucker et al. | |
| 2016/0292696 A1* | 10/2016 | Gong | H04L 63/101 |
| 2017/0011340 A1 | 1/2017 | Gabbai | |
| 2017/0011343 A1 | 1/2017 | Stenneth et al. | |
| 2017/0148467 A1* | 5/2017 | Franklin | G10L 25/51 |

FOREIGN PATENT DOCUMENTS

| | | |
|---|---|---|
| WO | 2013137534 A1 | 9/2013 |
| WO | 2015047613 A1 | 4/2015 |

OTHER PUBLICATIONS

A. Clapaud, "Skynet reinvents the mailbox for UAVs", Nov. 30, 2014, 4e Revolution, retrieved from webpage http://www.4erevolution.com/en/skynet-livraison-drone/, 2 pages.

Notification of Transmittal of The International Search Report and The Written Opinion of The International Searching Authority, or The Declaration; International Search Report; and Written Opinion of The International Searching Authority for corresponding International Application No. PCT/EP2018/061081, dated Aug. 1, 2018, 14 pages.

* cited by examiner

*Primary Examiner* — Thomas S McCormack
(74) *Attorney, Agent, or Firm* — Ditthavong & Steiner, P.C.

(57) ABSTRACT

An approach is provided for routing an aerial drone while preserving privacy. The approach involves processing model data depicting at least one structure to determine one or more privacy-sensitive features of the at least one structure. The approach also involves calculating line-of-sight data between a route of an aerial drone and the one or more privacy-sensitive features. The approach further involves configuring a routing of the aerial drone based on the line-of sight data when the aerial drone is traveling near the at least one structure.

20 Claims, 16 Drawing Sheets

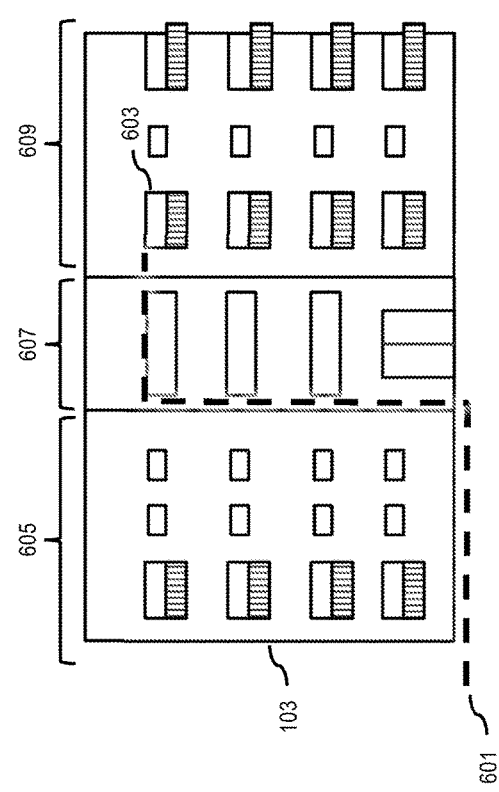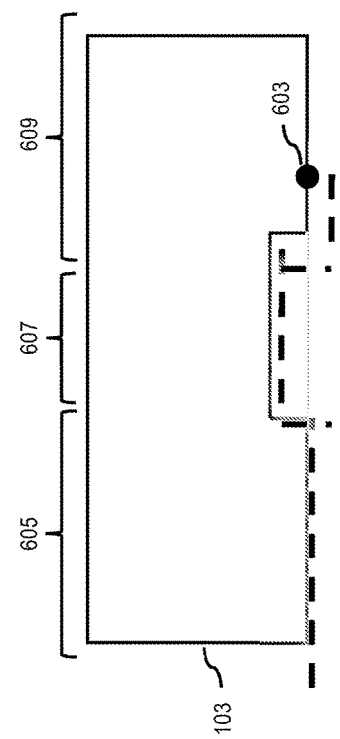
FIG. 6A
FIG. 6B

US 10,102,758 B1

METHOD AND APPARATUS FOR PRIVACY-SENSITIVE ROUTING OF AN AERIAL DRONE

BACKGROUND

The growing use of unmanned aerial vehicles (UAVs) or aerial drones has raised concerns about privacy because aerials drones often are equipped with an array of sensors (e.g., cameras) and can easily travel in areas where people traditionally have had an expectation of privacy (e.g., in their homes, backyards, etc.). This can be particularly problematic when aerial drones are used for commercial purposes (e.g., package deliveries) in population dense areas, where more people are likely to notice drone operations. Eventually, such concerns may lead to widespread opposition to the commercial or private use of drones. Accordingly, service providers and manufacturers face significant technical challenges to operating drones while also minimizing potential privacy concerns.

SOME EXAMPLE EMBODIMENTS

Therefore, there is a need for an approach for privacy-sensitive routing or operation of aerial drones.

According to one embodiment, a method comprises processing model data depicting at least one structure to determine one or more privacy-sensitive features of the at least one structure. The method also comprises calculating line-of-sight data between a route of an aerial drone and the one or more privacy-sensitive features. The method further comprises configuring a routing of the aerial drone based on the line-of sight data when the aerial drone is traveling near the at least one structure.

According to another embodiment, an apparatus comprises at least one processor, and at least one memory including computer program code for one or more computer programs, the at least one memory and the computer program code configured to, with the at least one processor, cause, at least in part, the apparatus to process model data depicting at least one structure to determine one or more privacy-sensitive features of the at least one structure. The apparatus is also caused to calculate line-of-sight data between a route of an aerial drone and the one or more privacy-sensitive features. The apparatus is further caused to configure a routing of the aerial drone based on the line-of sight data when the aerial drone is traveling near the at least one structure.

According to another embodiment, a computer-readable storage medium carries one or more sequences of one or more instructions which, when executed by one or more processors, cause, at least in part, an apparatus to process model data depicting at least one structure to determine one or more privacy-sensitive features of the at least one structure. The apparatus is also caused to calculate line-of-sight data between a route of an aerial drone and the one or more privacy-sensitive features. The apparatus is further caused to configure a routing of the aerial drone based on the line-of sight data when the aerial drone is traveling near the at least one structure.

According to another embodiment, an apparatus comprises means for processing model data depicting at least one structure to determine one or more privacy-sensitive features of the at least one structure. The apparatus also comprises means for calculating line-of-sight data between a route of an aerial drone and the one or more privacy-sensitive features. The apparatus further comprises means for configuring a routing of the aerial drone based on the line-of sight data when the aerial drone is traveling near the at least one structure.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A and 6B are diagrams illustrating a privacy-sensitive routing in a three-dimensional space surrounding a structure, according to one embodiment;

DESCRIPTION OF SOME EMBODIMENTS

Examples of a method, apparatus, and computer program for providing privacy-sensitive routing or operation of unmanned aerial vehicles (UAVs) or aerial drones are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
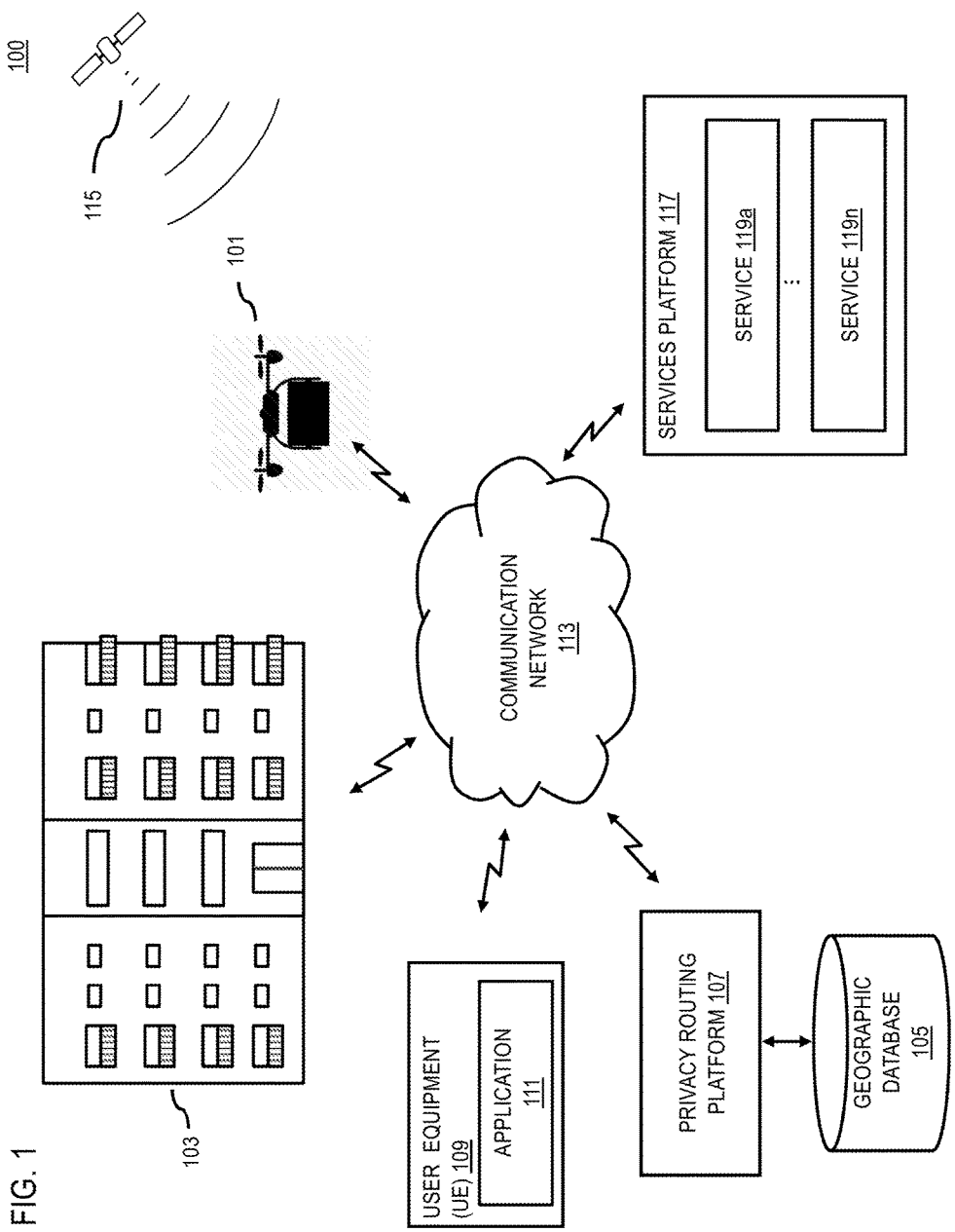
FIG. 1 is a diagram of a system capable of providing privacy-sensitive routing or mapping, according to one embodiment.

FIG. 1 is a diagram of a system capable of providing privacy-sensitive routing or mapping, according to one embodiment. As previously discussed, one area of interest among service providers and device manufacturers has been package delivery via aerial drones (e.g., drone 101). For example, there has been interest among various companies (e.g., Amazon, DHL, and Google) regarding aerial or drone-based package delivery services. Currently, such delivery drones are generally programmed to deliver packages to a defined location on the street level, which often means the front door of the building or some other designated street-level delivery location. In many cases, drones are capable to flying at roof top levels, but due to concerns about weather and privacy, the flight altitude of drones are often restricted. This can create a problem in package delivery scenarios because delivery on the street level may not be optimal. For example, for people living or working in multi-story buildings (e.g., apartment or office buildings such as building 103), delivery to a balcony or other higher locations of the buildings closer to the receiving individual can be a better solution.

However, one problem with making delivers to balconies or higher locations is the privacy of the people living or working in the buildings. For example, drones often are equipped with cameras or other recording devices, in addition to an array of other sensors (e.g., infrared sensors, wireless receivers, navigation sensors, etc.). In many cases, the drones are capable of streaming or recording the data from these cameras, recording device, sensors, etc. This can potentially create privacy concerns for people living or working these buildings.

Such privacy concerns exist even in cases where it is permissible (e.g., according to local flight regulations) for drones to fly in a range above roof top levels and below the airspace in which conventional air traffic occurs (e.g., conventional helicopters). In this case, drones may be able to save battery power while in the air by taking a more direct flight path over roof tops in public inhabited spaces. While there can be potentially fewer potential privacy issues when flying over roof tops (e.g., fewer windows or exposure points on roof tops; fewer people on roof tops, etc.), the final leg of the delivery to balconies or higher locations could still bring the drone to fly in closer proximity to parts of buildings that raise potential privacy concerns.

Figure 2:
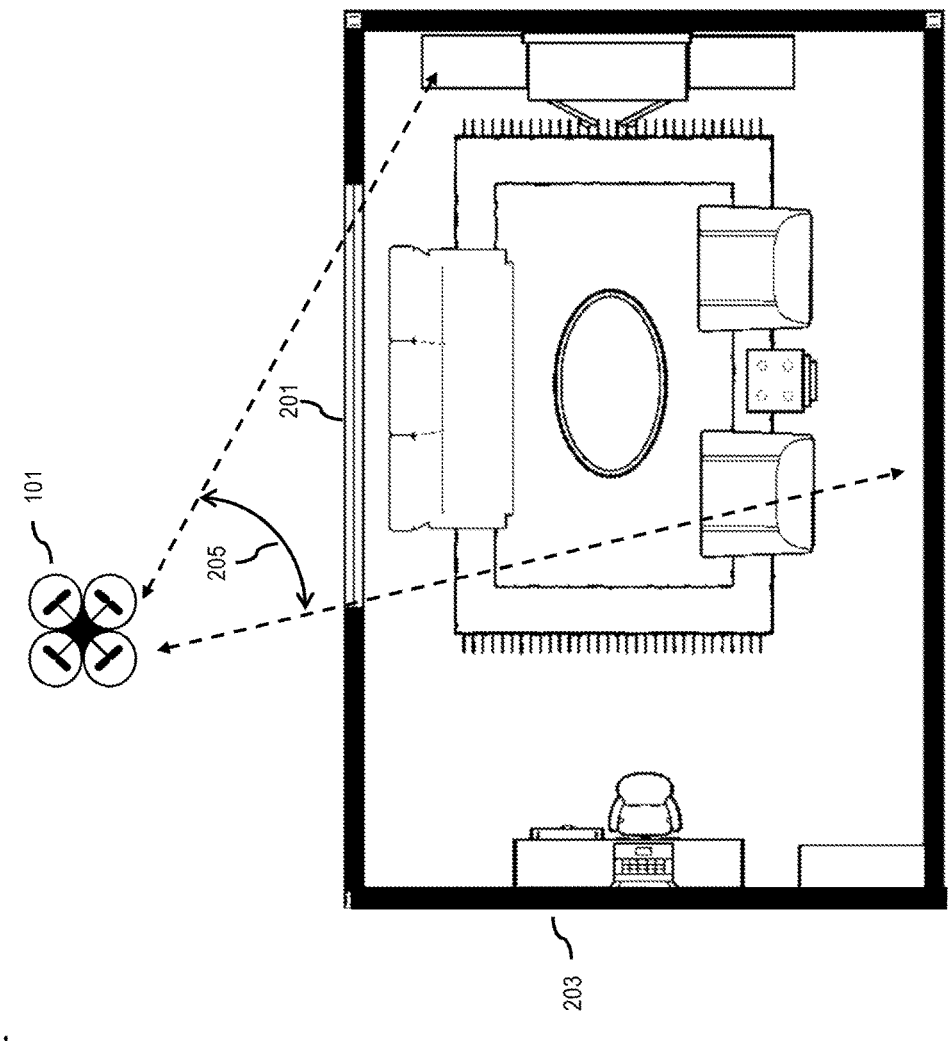
FIG. 2 is a diagram illustrating privacy concerns resulting from an aerial drone's line of sight or field of view, according to one embodiment.

An example of such a privacy concern is shown in FIG. 2. More specifically, FIG. 2 is a diagram illustrating privacy concerns resulting from an aerial drone's line of sight or field of view, according to one embodiment. As shown, the aerial drone 101 is flying near a window 201 of apartment 203 of a building (e.g., the building 103 of FIG. 1) to which the drone 101 is making a package delivery. As the drone 101 passes, the field of view 205 of the drone 101's cameras or other sensors also sweeps the interior of the apartment 203 to potentially expose a large portion of the interior of the apartment 203 to the drone 101, thereby creating potential privacy concerns. This field of view 205, for instance, represents a line of sight between the drone 101 and the interior of the apartment 203. It is contemplated the line of sight is with respect to both the drone 101 (e.g., what the drone 101 can see of the interior of the apartment 203) and an occupant of the apartment 203 (e.g., whether the occupant can see the drone 101 from within the apartment 203 as the drone 101 passes by). For example, when an occupant of the apartment 203 can see the drone 101 outside his or her window, the occupant is likely believe that his or her privacy is violated by the drone 101. This, in turn, can lead to the occupant to distrust the drone 101 and/or its operator (e.g., a package delivery company), which can further lead to distrust of the operator or the operator's brand by extension.

To address this problem, a system 100 of FIG. 1 introduces a capability to use information on a target delivery location at a building or structure (e.g., a balcony or other non-street level location of the building 103), three-dimensional (3D) model data of the building, and/or indoor mapping data of the buildings to identify windows or other privacy sensitive features of the building. By way of example, privacy sensitive features are physical features of the building 103 that represent windows, openings, doors, and/or the like that can provide a line of sight between the drone 101 or a potential route that can be taken by the drone 101 and an interior of the building or structure. The system 100 can then calculate a line of sight or field of view between the drone 101 or potential route of the drone 101 and the identified windows or privacy-sensitive features of the building or structure. In other words, in one embodiment, the system 100 can calculate a line of sight or field of view of any sensor of the drone 101 for a current or planned route of the drone 101 to determine whether that line of sight/field of view would result in the sensors capturing data (e.g., imaging data or other sensor) of the occupants or interior of the building.

In one embodiment, the line of sight or field of view can be directional. In other words, the line of sight can be from the perspective of the drone 101 to the occupants/interior of the building as described above, and/or it can be from the perspective of the occupants/interior of the building to the drone 101. For example, if the line of sight of field of view is calculated from the perspective of the occupant or interior of the building to the drone 101, the system 100 can minimize the visibility of the drone 101 to the occupants of the building. This can, for instance, reduce the probability that members of the public would see the drone 101 flying by their respective windows and causing those who see the drone 101 to have concern that the drone 101 may be capturing images or other data on them. In addition, a route that minimizes the visibility of the drone 101 to building occupants can also protect the privacy of the drone 101's delivery so that other occupants of the building for which the delivery is not intended do not see or have notice of when a delivery occurs.

In one embodiment, the system 100 uses the calculated line-of-sight or field-of-view data to route the drone 101 to the target delivery location or when flying by the building or structure based on configured privacy requirements. For example, the system 100 can adjust the variables used during the drone flight path or route, and adjust the flight paths or routes to accommodate the privacy requirements (e.g., requirement to avoid a direct line-of-sight into any window marked private or as a no-fly area). Such flight variables include, but are not limited to approach angle, height, distance from the building or structure, 3D location where the drone rises or descended, etc. In this way, the system 100 can advantageously configure a routing of the aerial drone (e.g., execute a flight plan or route) so that unintentional or inadvertent capturing of sensor data (e.g., images, recordings, etc.) from building occupants is minimized or avoided. This can, for instance, further reduce or eliminate computer resources (e.g., processing, memory, storage, bandwidth, etc. resources) that would otherwise be needed to post-process the sensor data to protect privacy after capture of the data. In an embodiment where the line of sight or field of view is calculated to protect the drone 101 from being seen by building occupants (e.g., a "stealth" mode), the system 100 can choose a flight path or route for the drone 101 that is close to non-see through features of the building (e.g., walls), while remaining hidden (e.g., no direct line of sight or field of view) from see through features (e.g., windows or other building openings).

In one embodiment, the more buildings or structures there are at any one location that can potentially fall within the line of sight of the drone 101 (e.g., visual line of sight and/or a line-of-sight of any sensor of the drone 101), the more complex the routing process becomes. In yet another embodiment, the system 100 can generate mapping data reflecting the calculated line-of-sight or field-of-field of view data of the 3D locations surrounding the buildings or structures of a geographical area. This mapping data can be stored, for instance, a map layer of a geographic database 105. In one embodiment, the flight path or route data calculated for a given delivery location or building can be recorded (e.g., in the geographic database 105) and reused for future drone trips or package deliveries to the same location. In one embodiment, the mapping data, line-of-sight data, and/or field-of-view data can also be specific to certain drone types, cameras, sensors, etc., thereby taking into account the technical specification and/or limitations of each drone type, camera, sensor, etc. when generating a privacy-sensitive route or flight path for the drone 101 to execute.

Figure 3:
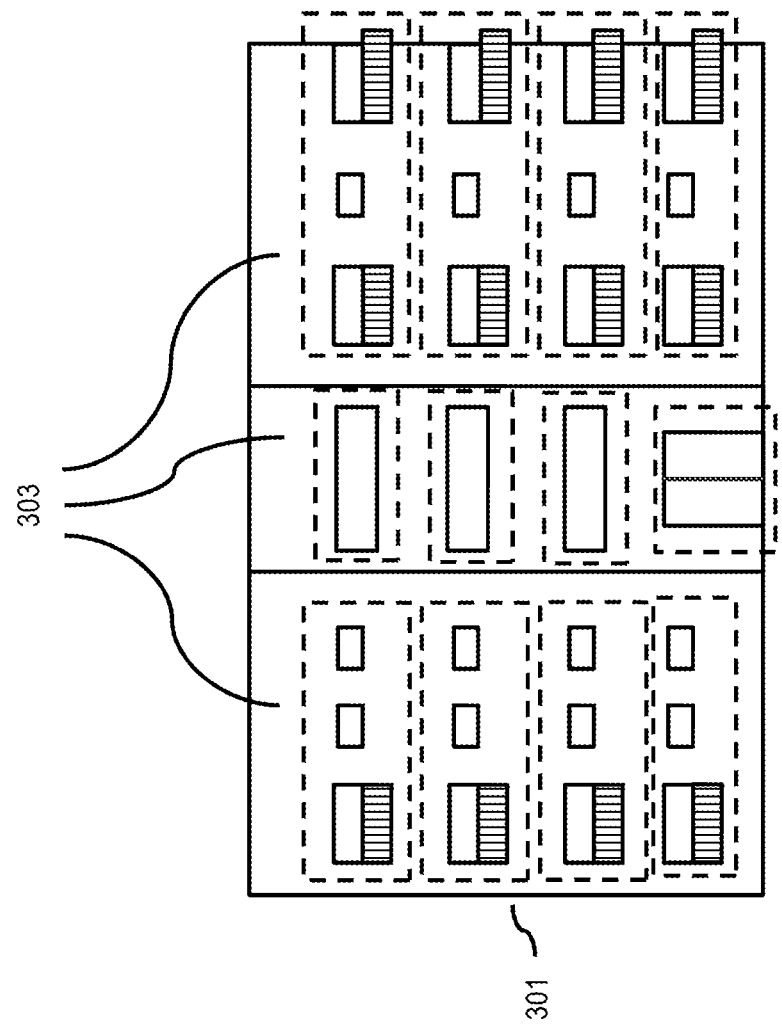
FIG. 3 is a diagram of privacy-sensitive features determined from model data representing a structure, according to one embodiment.

As described above, in one embodiment, the system 100 can use model data (e.g., 3D models) of a building or structure to determine privacy-sensitive features of the building. FIG. 3 is a diagram of privacy-sensitive features determined from model data representing a structure, according to one embodiment. In one embodiment, the system 100 (e.g., using a privacy routing platform 107) can retrieve model data representing a building of interest (e.g., building 103) from, e.g., the geographic database 105 or other similar data store. As shown in FIG. 3, this model data can include a 3D object model 301 representing a structure of interest (e.g., a target delivery location such as the building 103). In one embodiment, the 3D object model 301 is a polygonal or other mathematical representation of the building 103 and its features. By way of example, the 3D object model 301 can be mapped to geographic coordinates to a map to provide a geographically accurate representation of the building. In this way, location coordinates detected by the drone 101 can be used to determine its relative position in 3D space to the 3D object model 301.

In one embodiment, the system 100 can process the 3D object model 301 or fragments of the 3D object model 301 to identify portions of the model 301 that correspond to windows or other privacy-sensitives that can potentially provide either a visual or sensor-based line-of-sight between a nearby drone and an interior space of the building represented by the 3D object model 301. For example, identifying the windows or privacy-sensitive features can include search in the 3D object model 301 for polygonal fragments that match or otherwise indicate a presence of a privacy-sensitive feature of interest (e.g., polygonal fragments whose shape matches the shape of reference polygonal windows, openings, doors, etc.). If texture maps or images of the building 103 are also available for the 3D object model, the system 100 can confirm detected features against the image by performing object recognition of the privacy-sensitive feature in the image data corresponding to the polygonal fragment of the detected feature.

In the example of FIG. 3, the system 100 searches the 3D object model 301 for polygonal fragments corresponding to privacy-sensitive features (e.g., windows and doors). The privacy-sensitive features 303 detected using this approach is marked in FIG. 3 with dashed boxes. In one embodiment, the process for identifying privacy-sensitive features can stop at this point, and all identified polygonal fragments or features are marked as privacy-sensitive.

Figure 4A:
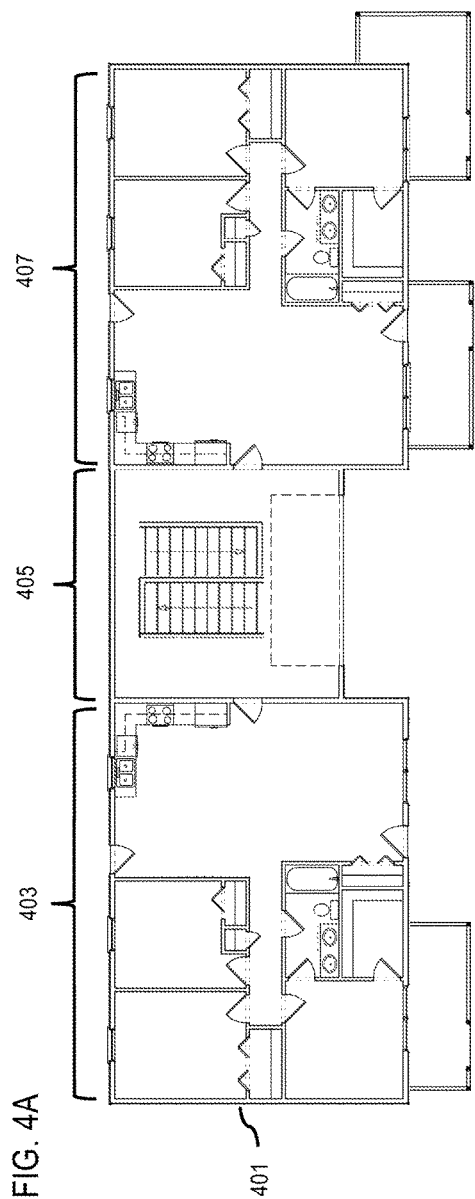
FIGS. 4A and 4B are diagrams illustrating a process for determining or classifying private-sensitive features of a structure based on indoor mapping data, according to one embodiment.
Figure 4B:
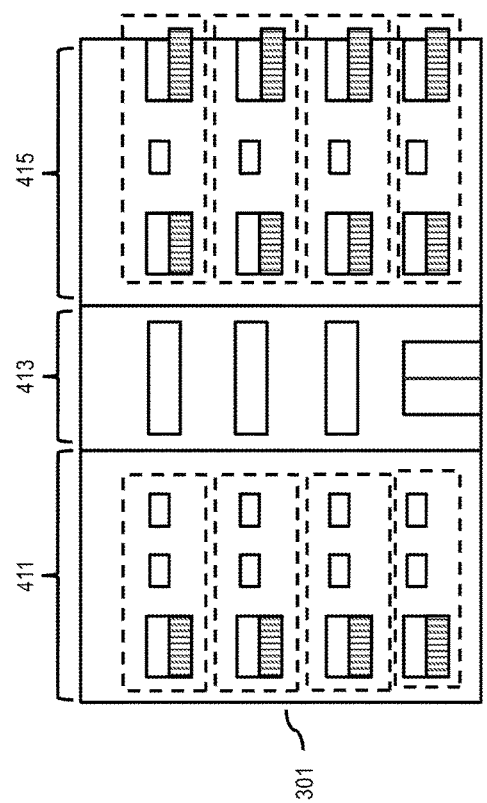

In other embodiments, the system 100 can further refine the designation of identified features as privacy-sensitive features using additional processes. For example, FIGS. 4A and 4B are diagrams illustrating a process for determining or classifying private-sensitive features of a structure based on indoor mapping data, according to one embodiment. In other words, in one embodiment, the system 100 can use indoor mapping data to map external features detected from model data against internal features to determine whether the detected external feature is privacy sensitive. In one embodiment, the system 100 can map the detected external feature to a specific address and a floor or room of the building the address refers to. The system 100 can then retrieve indoor mapping data for the determined floor or room.

FIG. 4A continues the example of FIG. 3, and illustrates example indoor map data 401 (e.g., a floorplan data) of one floor of the building 103 represented by the model 301 of FIG. 3. As noted in the discussion of FIG. 3, privacy-sensitive features were found in the left, center, and right sections of the building and model 301. The system 100 matches the indoor map 401 to the object 301 so that the left portion 403, the center portion 405, and the right portion 407 of the indoor map 401 matches the respective left, center, and right sections of the 3D object model 301. In this example, an analysis of the indoor map 401 indicates that the left portion 403 and the right portion 407 corresponds to residential space, and the center portion 405 corresponds to a public staircase or other communal space publicly accessible by residents, workers, or other occupants of the building. In one embodiment, the analysis can be based on metadata descriptive tags describing the corresponding sections of the indoor map 401. In addition or alternatively, the system 100 can perform the analysis by analyzing from the presence of specific features in the floorplan that is indicative of a private or a public space. For example, the presence of bathrooms or other similar living areas can be indicative of a private space as in the case of the left portion 403 and the right portion 407. As another example, the presence of a multi-story staircase can be indicative of a public space as in the case of the center portion 405.

In one embodiment, because the left portion 403 and the right portion 407 of the indoor map 401 are classified as private or residential spaces, the system 100 can designate or confirm the corresponding external features (e.g., windows, doors, etc.) detected in the object model 301 that match the respective left portion 403 and right portion 407 of the indoor map 401 as privacy sensitive. Because the center portion of the indoor map 401 is classified as a public space, the system 100 can designate the external features detected in the object model 301 that match the center portion 405 of the indoor map 401 as not privacy-sensitive features. Accordingly, as shown in FIG. 4B, the same object model 301 as depicted in FIG. 3 is now designated with privacy-sensitive features in the left section 411 and the right section 415, while the center section 413 is designated as having no privacy-sensitive features.

In one embodiment, the system 100 can also use the matching of the indoor map 401 to the object model 301 to determine potential delivery locations (e.g., balconies corresponding to a delivery address). In this case, the indoor map data 401 be used to map balconies or other potential delivery locations to an address of interest by determining whether the indoor space behind a balcony or potential delivery location corresponds to a delivery address. For example, the indoor map 401 may have metadata associating with a particular address, and then an analysis of the layout of the indoor space can indicate whether specific rooms, areas, etc. represented in the indoor map 401 correspond to the same address.

In yet another embodiment, whether an individual feature of a building or structure is designated as a privacy-sensitive can also be dependent on user preference or setting. For example, the system 100 can identify occupants of a building associated with detected windows or other privacy-sensitive features. The system 100 can then request permission by the occupant have drones routed by their respective windows or other features. If permission is provided, the system 100 can update a data record with a flag indicating the feature is not privacy-sensitive even if the feature would otherwise be designated as privacy-sensitive using model data and/or indoor mapping data.

In yet another embodiment, instead of having a binary designation of either privacy-sensitive or not privacy-sensitive, the system 100 can calculate or determine a privacy score for each feature that spans a range. The range can, but is not limited to, 0 for not-privacy sensitive, and 1 for 100% privacy-sensitive. In this way, for instance, different privacy scores can be calculated or specified for individual features depending on additional information such as indoor mapping, personal preference, etc. For example, a higher privacy-sensitive score can be specified for windows corresponding to areas with greater privacy sensitivity such as bedrooms or bathrooms, versus areas hallways, closets, etc. Similarly, an office building may features with higher privacy sensitivities when the features are windows to private offices, versus windows to reception areas which could be designated with lower privacy sensitivity scores. This embodiment of a privacy score calculation scheme is provided by way of illustration and not limitation. Accordingly, it is contemplated that any privacy score calculation process can be used to classify detected features of buildings according to the various embodiments described herein.

In another embodiment, privacy-sensitivities can vary with contextual parameters such as time-of-day, day-of-week, season, etc. For example, privacy sensitivity for features of apartment buildings can be lower during work hours on weekdays when people are less likely to be home, but higher on weekends or evening hours when they are more likely to be home.

Figure 5:
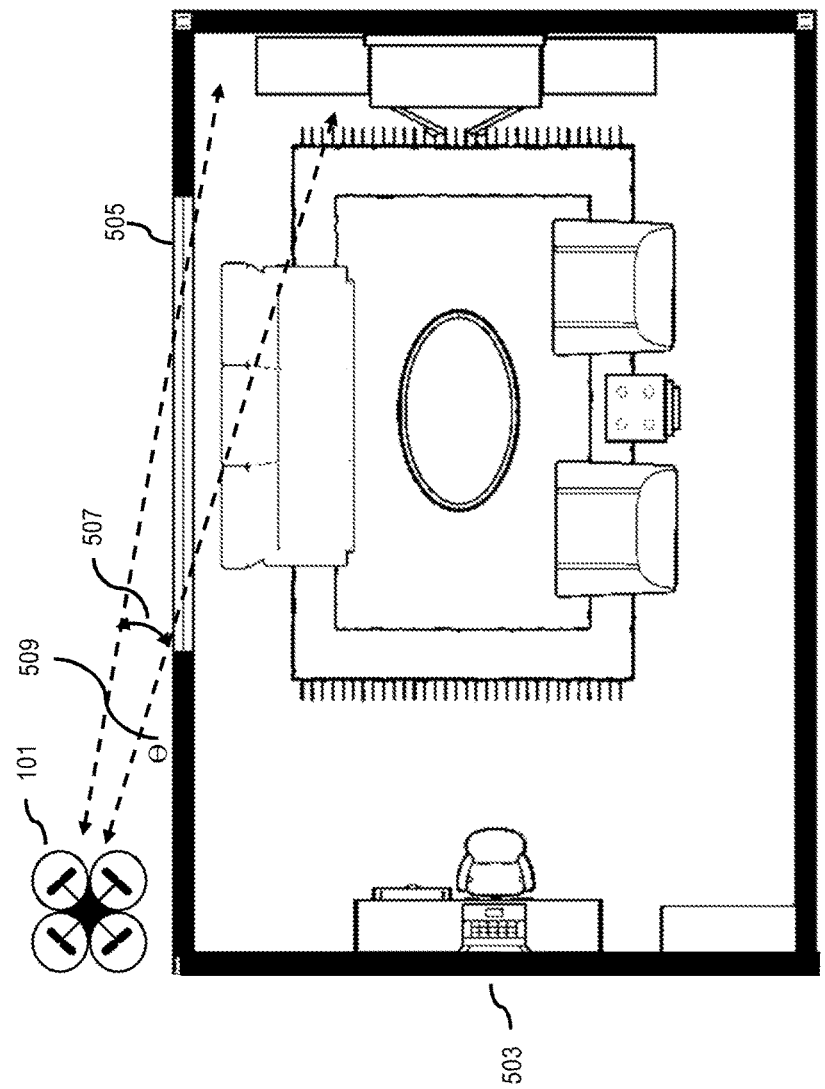
FIG. 5 is a diagram illustrating a process for minimizing or avoiding a direct line of sight between a drone and an interior space of a structure, according to one embodiment.

In one embodiment, based on the identified privacy-sensitive features of a building or structure of interest, the system 100 can calculate line-of-sight or field-of-view data for routing an aerial drown to or near the building 103. By way of example, the system 100 can perform calculations to determine what flight path or route near the building 103 will minimize or avoid a direct line-of-sight between the drone and an interior of the building through the identified privacy-sensitive features (e.g., in either direction or both directions from the drone 101 to the occupants/interior or from the occupants/interior to the drone 101). FIG. 5 is a diagram illustrating a process for minimizing or avoiding a direct line of sight between a drone and an interior space of a structure, according to one embodiment. For example, as shown in FIG. 5, the system 100 can calculate different flight variables (e.g., angle of approach, height, distance from building, 3D location where drone rises or descends) for a flight path of the drone 101 such that the resulting incidence angle 509 ($\Theta$) of the line-of-sight into the interior of the apartment 503 through the window 505 is less than a threshold angle if the line of sight is to be minimized, or there is no line of sight into the interior of the apartment 503 if a line of sight is to be avoided altogether. Similarly, the system 10 can seek to minimize the field of view 507 to less than a threshold angular range to minimize the field-of-view.

By performing such a calculation for each potential flight path or route with respect to each identified privacy-sensitive that could be encountered by the drone 101 along the route, the system 100 can configure a privacy-sensitive routing for the drone 101. FIGS. 6A and 6B are diagrams illustrating a privacy-sensitive routing in a three-dimensional space surrounding a structure (e.g., the building 103), according to one embodiment. In this example, FIG. 6A depicts a privacy-sensitive route 601 to a delivery location 603 from a front view of the building 103, and FIG. 6B depicts the same privacy-sensitive route 601 to the delivery location 603 from a top view of the building 103. The example of FIGS. 6A and 6B continue with the example of FIG. 4B. Accordingly, the left section 605 and the right section 609 of the building 103 have privacy sensitive features (e.g., windows), while the center section 607 does not.

Therefore, to minimize privacy concerns, the system 100 calculates a flight path or route 601 of the drone 101, so that the route 601 traverses the left section 605 at street level below any of privacy sensitive windows of the privacy section 605 to avoid line-of-sight into those features. On entering the section 607 of the building 103, the route 601 rises to a height of the delivery location 603 as indicated in the front view of FIG. 6A. In addition, because the center section 607 is recessed with respect to the left section 605 and the right section 609, the route 611 can follow the contours of the recess of the center section 607. This, for instance, provides further privacy protection (e.g., by reducing any potential line-of-sight issues with the left section 605 or the right section 607) as well as potential protection against wind gusts along the front of the building. The route 611 then traverses a window in the center section 607 that is not privacy sensitive (e.g., because the window leads into a public staircase), to the delivery location 603 in the right section 609. As shown, the route 611 is privacy sensitive, because it avoids potential line-of-sight exposure to the interior of the building 103 through any of the windows marked as privacy-sensitive.

In addition or as an alternate to configuring drone routing to protect privacy, the system 100 can take other actions to enhance privacy when operating drones. For example, in one embodiment, the drone can deactivate or switch off cameras, sensors, device, etc. that might not be needed during a portion of the flight path with potential line-of-sight exposure to an interior of a building. However, in some cases, deactivation of cameras, sensors, etc. may not be possible because those sensors are needed for navigation (e.g., to avoid colliding with objects, the building, etc.). Accordingly, in another embodiment, the system 100 can change an operational mode of the sensors by limiting its field of view, reducing resolution, decreasing sampling frequency, decreasing recording time, etc. However, this change in mode typically would not be noticeable to people who see the drone 101 in operation. Therefore, the drone 101 in this mode of operation may still create privacy concerns in people show see the drone in operation.

Figure 7:
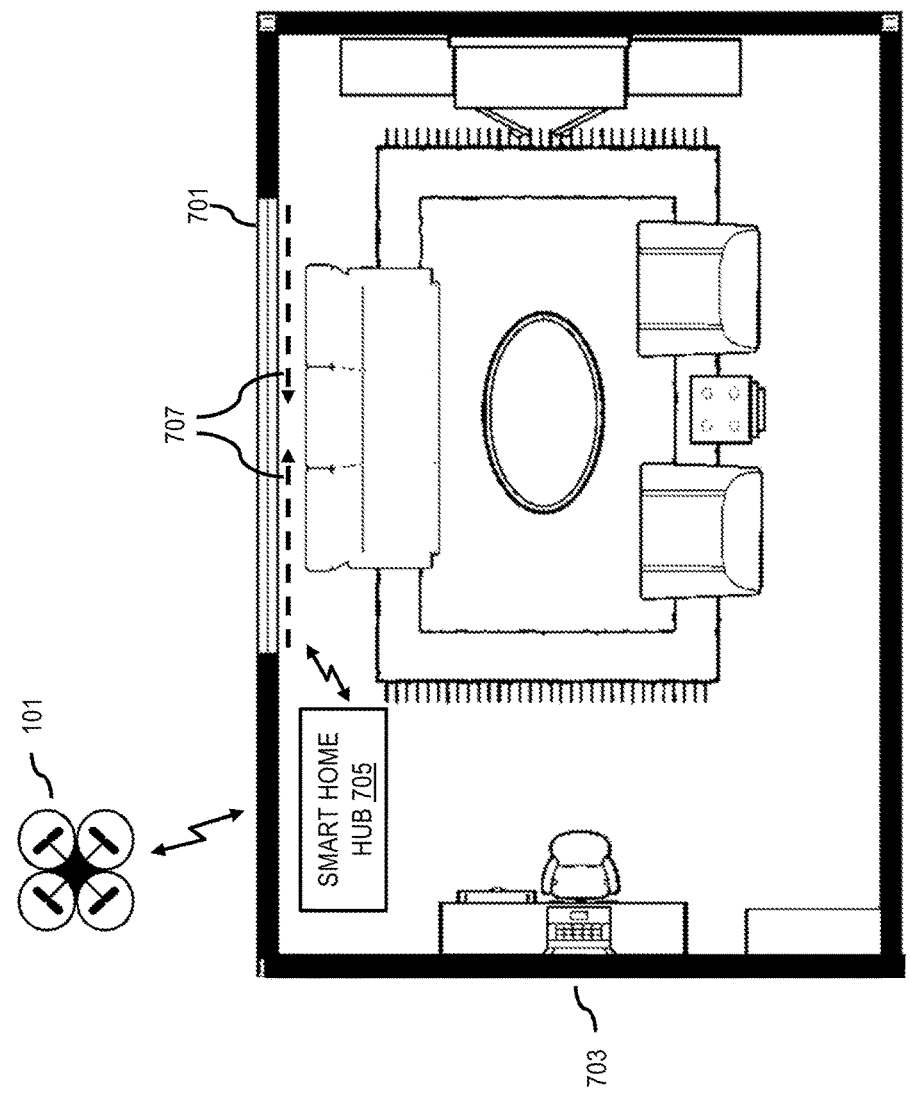
FIG. 7 is a diagram illustrating communications between a drone and a structure to take privacy-preserving measures, according to one embodiment.

In one embodiment, the system 100 can interact directly with buildings, apartments, offices, etc. to reduce potential privacy concerns, for instance, when drone-to-infrastructure communications are available or otherwise supported. FIG. 7 is a diagram illustrating communications between a drone and a structure to take privacy-preserving measures, according to one embodiment. In this example, a drone 101 detects that it is approaching a privacy sensitive window 701 of an apartment 703 and transmits a signal to an infrastructure receiver (e.g., a smart home hub 705 for an individual apartment, or another receiver/controller designated for the entire building) before the drone 101 passes by the window 701. The signal can indicate to the smart home hub 705 that it should take a privacy-preserving measure to avoid or mitigate line-of-sight issues from the passing drone 101. In this example, the smart home hub 705 is configured with to signal a set of smart curtains 707 to close so that the line of sight between the drone 101 and the interior of the apartment 703 is obscured. It is noted that closing curtains 707 is only one example of a privacy preserving measure, and that it is contemplated that the smart home hub 705 or other infrastructure component can take any to obscure or mitigate the line-of-sight to or from the drone 101. In one embodiment, the smart home hub 705 or other infrastructure component can signal to the drone 101 to pause its flight path until such privacy-preserving measures are taken or complete (e.g., curtains 707 have been closed). Then once the drone 101 has passed the window 701, the drone 101 can optionally signal to the smart home hub 705 that privacy-preserving measures are no longer needed or can be deactivated.

Returning to FIG. 1, as shown, the system 100 comprises an aerial drone 101 equipped with a variety of sensors that is capable flying or operating near a building 103. In one embodiment, the drone 101 can fly autonomously or under direct control via a user equipment (UE) 109 that may include or be associated with one or more software applications 111 supporting privacy-sensitive routing according to the embodiments described herein. In one embodiment, the system 100 further includes a privacy routing platform 107 coupled to a geographic database 105, wherein the privacy routing platform 107 is performs the functions associated with privacy-sensitive routing or operation of the drone 101 as discussed with respect to the various embodiments described herein. In one embodiment, the drone 101, privacy routing platform 107, UE 109, and other components of the system 100 have connectivity to each other via a communication network 113.

In one embodiment, the aerial drone 109 is a UAV capable of operating autonomously or via a remote pilot using UE 109 to fly the drone 101 or configure a flight path or route for the drone 101. In one embodiment, the drone 101 is configured to carry package payloads for delivery to specified addresses. The drone 101 many include any of sensors including cameras, recording devices, communication devices, etc. By way example, the sensors may include, but are not limited to, a global positioning system (GPS) sensor for gathering location data based on signals from a satellite 115, Light Detection And Ranging (LIDAR) for gathering distance data and/or generating depth maps, a network detection sensor for detecting wireless signals or receivers for different short-range communications (e.g., Bluetooth®, Wireless Fidelity (Wi-Fi), Li-Fi, Near Field Communication (NFC), etc.), temporal information sensors, a camera/imaging sensor for gathering image data, a package tracking sensor for tracking package movement, and the like. The drone 101 may also include recording devices for recording, storing, and/or streaming sensor and/or other telemetry data to the UE 109 and/or the privacy routing platform 107.

In one embodiment, the drone 101 is capable of being configured with and executing at least one delivery path (e.g., flight path or route) based, at least in part, on avoiding line-of-sight to privacy sensitive features of buildings, one or more obstructions, one or more restricted paths, or a combination thereof associated with a target delivery location surface and/or geographic areas/features proximate to the delivery location. By way of example, the obstructions may include, at least in part, trees or tree branches, utility lines or utility poles, building structures (e.g., a house), etc. The one or more restricted paths, for example, may include one or more governmental regulations that govern/restrict the path that the drone 101 may fly (e.g., Federal Aviation Administration (FAA) policies regarding required distances between objects). In one embodiment, the system 100 may also take into account one or more pertinent environmental or weather conditions (e.g., lighting, sheer winds around a building, vortices, etc.) in determining a privacy-sensitive delivery path.

In one embodiment, the drone 101 may determine contextual information such as wind and weather conditions in route that may affect the drone 101's ability to follow the specified privacy-sensitive path (e.g., using one or more onboard sensors) and then relay this information in substantially real-time to the system 100. In one embodiment, the drone 101 may request one or more modifications of the delivery path based, at least in part, on the determination of the contextual information or a change in the privacy sensitivity features (e.g., dynamic features such as automated privacy-preserving measure taken by a building 103 or its occupants). In one embodiment, the system 100 creates a data object to represent the delivery path, and may automatically modify the delivery path data object based on receipt of the contextual information from the drone 101 or another source and then transmit the new delivery path data object to the drone 101 for execution. In one embodiment, the drone 101 can determine or access the new delivery path data object and/or determine or access just the relevant portions and adjust its delivery path accordingly. For example, in windy conditions, the system 100 may condense the width of the drone 101's flight path to better ensure that the UAV will avoid tree branches or structures near the target delivery surface or location.

By way of example, a UE 109 is any type of dedicated UAV/drone control unit, mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 109 can support any type of interface to the user (such as "wearable" circuitry, etc.). In one embodiment, a UE 109 may support any type of interface for piloting or routing the drone 101 (e.g., for package delivery). In addition, a UE 109 may facilitate various input means for receiving and generating information, including, but not restricted to, a touch screen capability, a keyboard and keypad data entry, a voice-based input mechanism, and the like. Any known and future implementations of a UE 109 may also be applicable.

By way of example, the UE 109 and/or the drone 101 may execute applications 111, which may include various applications such as a privacy routing application, a package tracking/reading application, a location-based service application, a navigation application, a content provisioning application, a camera/imaging application, a media player application, an e-commerce application, a social networking application, and/or the like. In one embodiment, the applications 111 may include one or more feature recognition applications used for identifying or mapping privacy-sensitive features or routes according to the embodiments described herein. In one embodiment, the application 111 may act as a client for the privacy routing platform 107 and perform one or more functions of the privacy routing platform 107. In one embodiment, an application 111 may be considered as a Graphical User Interface (GUI) that can enable a user to configure a privacy-sensitive route or flight path for execution by drone 101.

In one embodiment, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the privacy routing platform 107 can interact with a services platform 117 to receive data (e.g., model data, indoor mapping data, etc.) for providing privacy-sensitive routing or operation of the drone 101. By way of example, the services platform 117 may include one or more services 119a-119n for providing content (e.g., 3D object models of buildings, LIDAR data, building cartography data, 2D/3D aerial imagery, etc.), provisioning services, application services, storage services, mapping services, navigation services, contextual information determination services, location-based services, information-based services (e.g., weather), etc. By way of example, the services 119 may have provide or store building or home schematics, pedestrian probes, sensors such as the sensors 105, or a combination thereof. In one embodiment, the content may be retrieved from satellites 115 in real time. In one embodiment, the services platform 117 may include or be associated with at least one database 105. By way of example, the at least one database 105 may include, at least in part, LIDAR data, 2D/3D aerial imagery data, governmental policies/restrictions data, depth-map data, building cartography data, etc. In one embodiment, the services platform 117 may interact with the drone 101, UE 109, and/or privacy routing platform 107 to supplement or aid in processing of the delivery path information.

By way of example, the drone 101, UE 109, privacy routing platform 107, and the services platform 117 communicate with each other and other components of the communication network 113 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
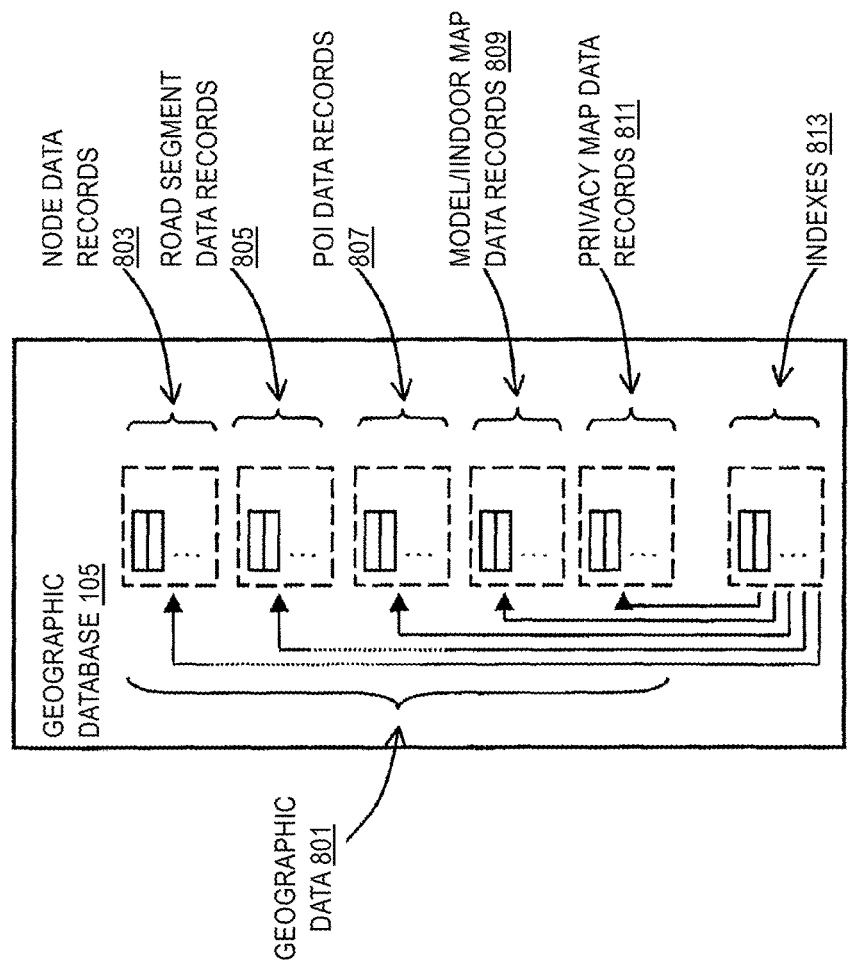
FIG. 8 is a diagram of a geographic database capable of storing map data of privacy-sensitive features, according to one embodiment.

FIG. 8 is a diagram of a geographic database capable of storing map data of privacy-sensitive features, according to one embodiment. In one embodiment, the geographic database 105 includes geographic data 801 used for (or configured to be compiled to be used for) mapping and/or navigation-related services, such as for routing drones to create a 3D flightpath or route. In one embodiment, the 3D flightpath or route is executed a drone 101 for package delivery to a target delivery location (e.g., a balcony or other location in a target building). For example, the geographic database 801 stores model data (e.g., 3D object models of buildings/structures) and indoor maps of those structures, among other related data.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three dimensional polygon extrusions, models, routes, etc. Accordingly, the terms polygons and polygon extrusions/models as used herein can be used interchangeably.

In one embodiment, the following terminology applies to the representation of geographic features in the geographic database 105.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 105 follows certain conventions. For example, links do not cross themselves and do not cross each other except at a node. Also, there are no duplicated shape points, nodes, or links. Two links that connect each other have a common node. In the geographic database 105, overlapping geographic features are represented by overlapping polygons. When polygons overlap, the boundary of one polygon crosses the boundary of the other polygon. In the geographic database 105, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 801 of the database 105 includes node data records 803, road segment or link data records 805, POI data records 807, model/indoor map data records 809, privacy map data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 105. In one embodiment, the indexes 813 may be used to quickly locate data without having to search every row in the geographic database 105 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. In addition, the geographic database 105 can contain path segment and node data records or other data that represent 3D paths around 3D map features (e.g., terrain features, buildings, other structures, etc.) that occur above street level, such as when routing or representing flightpaths of aerial vehicles (e.g., drones 101), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 105 can include data about the POIs and their respective locations in the POI data records 807. The geographic database 105 can also include data about places, such as cities, towns, or other communities, and other geographic features, such as bodies of water, mountain ranges, etc. Such place or feature data can be part of the POI data records 307 or can be associated with POIs or POI data records 807 (such as a data point used for displaying or representing a position of a city).

In one embodiment, the geographic database 105 can also include model/indoor map data records 809 for storing model data (e.g., 3D object models) and indoor map data of buildings or structures present within a geographical area represented in the geographic database 105. In one embodiment, the 3D model data of buildings/structures can be created from LiDAR, aerial/satellite-based 3D sensor data, and/or other 3D sensor data collected for a geographic area. For example, mobile mapping vehicles equipped with LiDAR and/or equivalent sensors can provide 3D model data for features of buildings near or visible from a street level, while equivalent aerial/satellite-based 3D sensor data can provide 3D model data from higher perspectives. Indoor map data can also be obtained in a similar, with portable or smaller mapping devices/vehicles used to access indoor locations for scanning or mapping. In one embodiment, the model/indoor map data records 809 can be associated with one or more of the node records 803, road segment records 805, and/or POI data records 807 so that the model data and/or indoor maps can inherent characteristics, properties, metadata, etc. of the associated records (e.g., location, address, POI type, etc.). In one embodiment, the system 100 (e.g., via the privacy routing platform 107 can use the additional characteristics, properties, metadata, etc. to classify the privacy scores or privacy sensitivities of the associated model data and/or indoor map data. The resulting model and indoor map data can then be stored in the model/indoor map data records 809 use retrieval and use by the components of the system 100 for providing privacy sensitive routing according to the embodiments described herein.

As discussed previously, the system 100 is capable of generating privacy-sensitive routes by, for instance, routing based on determined line-of-sight information with respect to privacy-sensitive features identified from the model/indoor map data records 809. In one embodiment, the resulting routing and/or line-of-sight data from various 3D locations can be stored in a map layer corresponding to the privacy map data records 811. By way of example, the data records 809 can be created for individual 3D flightpaths or routes as they are requested for specific delivery addresses. In this way, previously generated privacy-sensitive routes can be reused for future drone-based deliveries or travel to the same target location.

In addition or alternatively, in one embodiment, the privacy routing platform 107 can precompute or map line-of-sight data or field-of-vision data into privacy sensitive features (e.g., windows, doors, other openings, etc.) of buildings or structures in geographic region to generate the privacy map data records 811 for subsequent retrieval. In one embodiment, a privacy map can be generated for the airspace surrounding all buildings in a geographic region. In other embodiments, the privacy map may be pre-calculated for only a subset of the buildings or structures (e.g., only buildings with potential delivery locations, buildings with the most popular or frequent deliveries, etc.).

In one embodiment, the privacy map stored in the privacy map data records 811 can be specific to characteristics of the drone 101 (e.g., drone type), sensor of the drone 101 (e.g., camera, infrared sensor, WiFi detector, etc.), the delivery location (e.g., whether the building/location supports drone-to-infrastructure communication to trigger privacy preserving measures), and the like. In addition, the privacy map and/or privacy-sensitive routing generated according to the embodiments described herein can be based on contextual parameters (e.g., time-of-day, day-of-week, season, etc.).

It is noted that although the privacy map data records 811 may be generated to support package delivery via aerial drone, the resulting map layer representing the collection of privacy map data records 811 of the geographic database 105 may be used for any other purpose or use where line-of-sight/privacy sensitivity data into features (e.g., windows, doors, openings, etc.) that can expose the interior of buildings/structures to outside view can be used.

In one embodiment, the geographic database 105 can be maintained by the services platform 117 and/or any of the services 119 of the services platform 117 (e.g., a map developer). The map developer can collect geographic data to generate and enhance the geographic database 105. There can be different ways used by the map developer to collect data. These ways can include obtaining data from other sources, such as municipalities or respective geographic authorities. In addition, the map developer can employ aerial drones (e.g., using the embodiments of the privacy-routing process described herein) or field vehicles (e.g., mapping drones or vehicles equipped with mapping sensor arrays, e.g., LiDAR) to travel along roads and/or within buildings/structures throughout the geographic region to observe features and/or record information about them, for example. Also, remote sensing, such as aerial or satellite photography or other sensor data, can be used.

The geographic database 105 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle, such as by the drone 101, for example. The navigation-related functions can correspond to 3D flightpath or navigation, 3D route planning for package delivery, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

Figure 9:
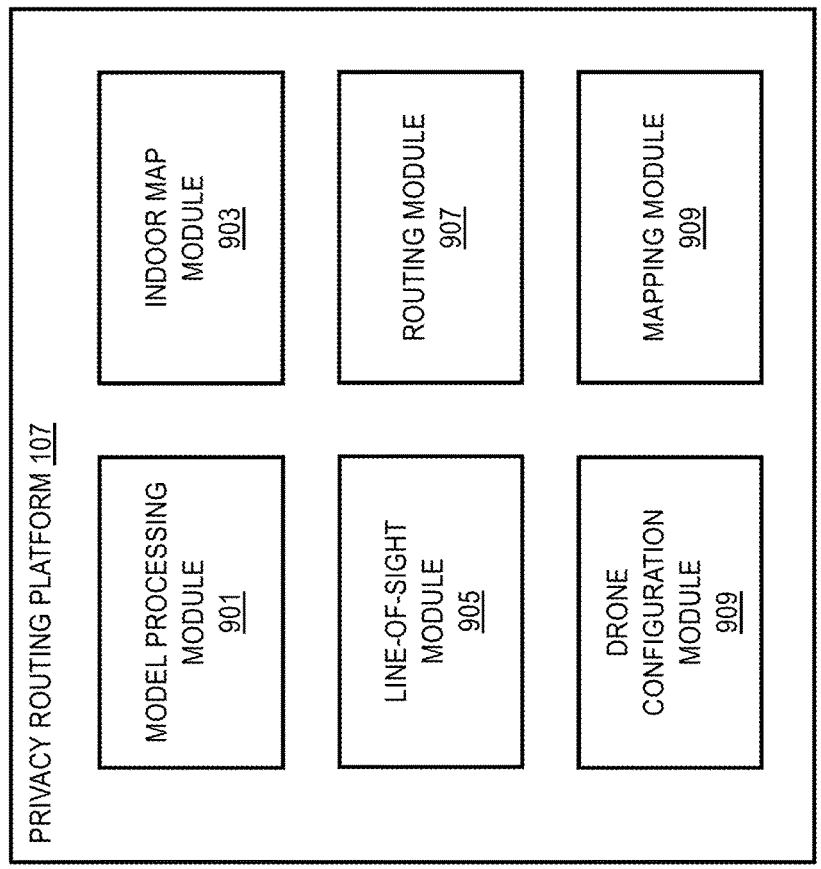
FIG. 9 is a diagram of the components of a privacy routing platform, according to one embodiment.

FIG. 9 is a diagram of the components of a privacy routing platform 107, according to one embodiment. By way of example, the privacy routing platform 107 includes one or more components for providing privacy sensitive routing of a drone 101 according to the various embodiments described herein. It is contemplated that the functions of these components may be combined or performed by other components of equivalent functionality. In this embodiment, the path privacy routing platform 107 includes a model processing module 901, an indoor map module 903, a line-of-sight module 905, a routing module 907, a drone configuration module 909, and a mapping module 911. The above presented modules and components of the privacy routing platform 107 can be implemented in hardware, firmware, software, or a combination thereof. Though depicted as a separate entity in FIG. 1, it is contemplated that the privacy routing platform 107 may be implemented as a module of any of the components of the system 100 (e.g., a component of the drone 101 and/or the UE 109). In another embodiment, one or more of the modules 901-911 may be implemented as a cloud based service, local service, native application, or combination thereof. The functions of these modules are discussed with respect to FIGS. 10 and 11 below.

Figure 10:
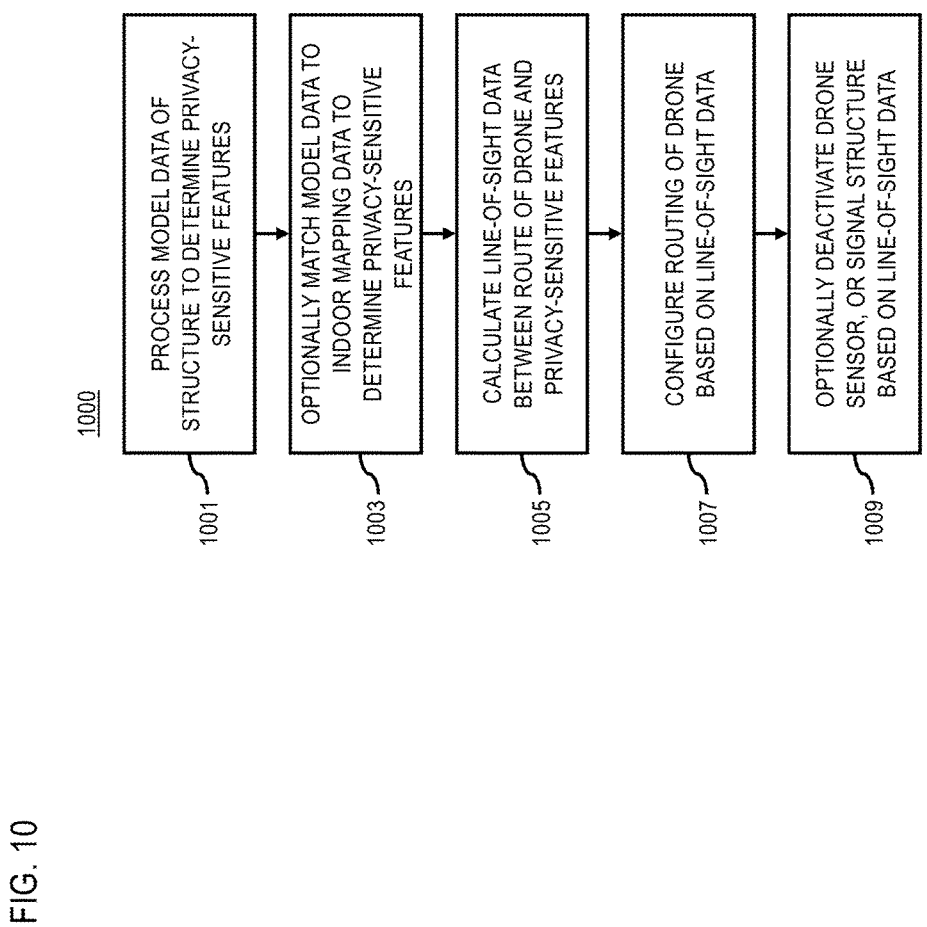
FIG. 10 is a flowchart of a process for providing privacy-sensitive routing or operation of a drone, according to one embodiment.
Figure 15:
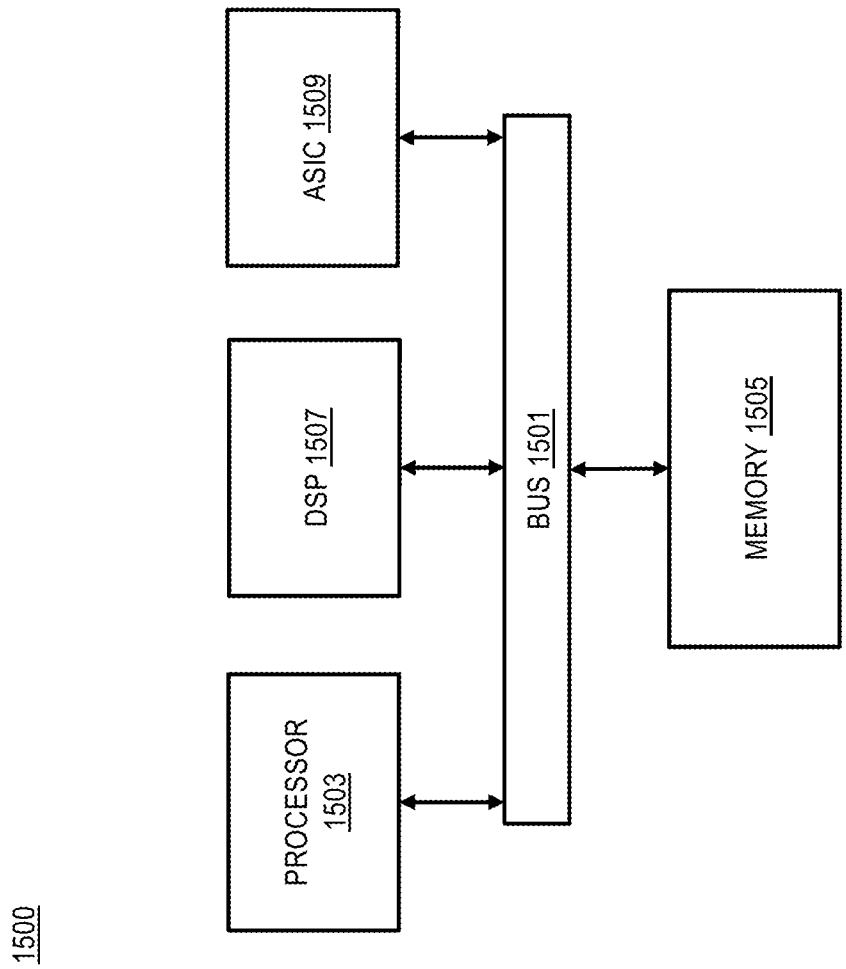
FIG. 15 is a diagram of a chip set that can be used to implement an embodiment.

FIG. 10 is a flowchart of a process for providing privacy-sensitive routing or operation of a drone, according to one embodiment. In various embodiments, the privacy routing platform 107 and/or any of the modules 901-911 of the privacy routing platform 107 as shown in FIG. 9 may perform one or more portions of the process 1000 and may be implemented in, for instance, a chip set including a processor and a memory as shown in FIG. 15. As such, the privacy routing platform 107 and/or the modules 901-911 can provide means for accomplishing various parts of the process 1000, as well as means for accomplishing embodiments of other processes described herein in conjunction with other components of the system 100. Although the process 1000 is illustrated and described as a sequence of steps, its contemplated that various embodiments of the process 1000 may be performed in any order or combination and need not include all of the illustrated steps.

In the example of FIG. 10, the privacy routing platform 107 has received a request to route a drone 101 to a target location or destination using a privacy sensitive route (e.g., for initiating a package delivery). The target location, for instance, is a balcony or other high location of a structure (e.g., apartment building) that may potentially have privacy concerns because a potential route of the drone 101 may pass or cause the drone 101 to pass windows or other privacy-sensitive features of other occupants. Accordingly, in step 1001, the model processing module 901 processes model data depicting at least one structure (e.g., the target building and/or any other nearby buildings) to determine one or more privacy-sensitive features of the at least one structure. The model processing module 901, for instance, can query the geographic database for a 3D object model of the building corresponding to an address of the target location. In one embodiment, the model processing module 901 can also retrieve model data for other nearby buildings that are within a range of the sensors (e.g., cameras) of the drone 101. In this way, the privacy routing being requested can consider complex scenarios where multiple buildings are located near a target delivery location, and can be potentially exposed to a line-of-sight or field-of-view of the drone 101. In one embodiment, the one or more privacy-sensitive features include one or more windows, one or more openings, or a combination thereof of the at least one structure. As previously noted, these features are any physical feature of the building or structure that can expose a view or line-of-sight into an interior of the building.

In one embodiment, the model processing module 901 can use feature recognition software or equivalent process to identify fragments of portions of the model data that correspond to the features of interest (e.g., windows, doors, openings, etc.). The model processing module 901 can determine, for instance, the dimensions, location on the exterior of the building, and/or the like of the identified privacy-sensitive features. If information is available, the model processing module 901 can also determine or query for types of materials (e.g., glass, mirrored glass, infra-red blocking sensors, etc.) of the features. These materials, for instance, can be used to determine the whether a line-of-sight is possible or exists with respective the privacy-sensitive features.

In step 1003, the indoor map module 903 can optionally match the model data against indoor mapping data of the at least one structure. The one or more privacy-sensitive features are further determined based on the matching. In other words, because the line-of-sight to be calculated below is with respect to a line-of-sight into an interior of a structure or building, a better understanding of the interior of the building (e.g., provided by the indoor mapping data) enables the privacy routing platform 107 to further refine its determination of what features of a building are privacy sensitive. For example, the indoor map module 903 can align the indoor mapping data to external features according to their mapped geographic coordinates. The indoor map module 903 can then identify what types of areas (e.g., private areas such as apartments or offices, versus public areas such as shared hallways or spaces) would be exposed by each identified feature (e.g., window, door, opening, etc.). Then based on the privacy rating of the interior area matched from the indoor mapping data, the indoor map module 903 can designate each feature identified using the model data as either a privacy-sensitive feature or not.

In step 1005, the line-of-sight module 905 calculates line-of-sight data between the aerial drone 101 or a route of the aerial drone and the one or more privacy-sensitive features. In one embodiment, the line-of-sight data is based on a visual line of sight, a sensor-based line of sight, or a combination thereof. Accordingly, this line-of-sight data or field-of-view data can be dependent on the technical capabilities of the drone 101 and/or its sensor (e.g., camera resolution, field of view, etc.), as well as the physical dimensions of the privacy-sensitive feature (e.g., size, shape, location, etc.). By way of example, the line-of-sight data can be calculated with respect to potential routes or locations of the drone (e.g., geographic coordinates of the drone in 3D airspace surrounding the building), and identify the line-of-sight for the requested locations or routes. For example, when calculating line-of-sight data based on potential routes, the line-of-sight module 905 can advantageously evaluate multiple flight plans for privacy sensitivity before executing the routes with the drone 101. In addition or alternatively, the line-of-sight data can be calculated at predetermined and regular location intervals in 3D space surrounding a structure or group of structure to provide an overall view of potential line-of-sights.

In step 1007, the routing module 907 computes a routing of the drone 101 to a delivery location so that a direct line-of-sight between the aerial drone and an interior location of the at least one structure through the one or more privacy-sensitive features is avoided or minimized. Examples of avoiding or minimizing a line of sight is discussed with respect to FIG. 5 above. In one embodiment, the routing module 907 generates a flight plan for the aerial drone to make a delivery to at least one location at or near the at least one structure, wherein the flight plan is based on the line-of-sight data. In one embodiment, the flight plan for the aerial drone specifies an approach angle, a height of the aerial drone, a distance of the aerial drone from the one or more privacy-sensitive features, a location where the aerial drone is to rise, a location where the aerial drone is to descend, or a combination thereof. The variables are constructed, for instance, so that line-of-sight criteria specified by the system 100 are met. For example, the line-of-sight criteria may specify what the maximum line-of-sight angle and/or maximum line-of-sight field of view into an interior space of a building through the one or more privacy sensitive features. If the criteria cannot be met by any possible path, a system operator can be alerted and/or be presented with a route that minimizes areas where the line-of-sight criteria cannot be met.

In one embodiment, the drone configuration module 909 then configures a routing of the aerial drone based on the line-of sight data when the aerial drone is traveling near the at least one structure. By way of example, the drone configuration module 909 configures the drone 101 by transmitting the routing or flight plan generated above to the drone 101 and/or an operator/pilot of the drone at the UE 109, and then initiates an execution of the flight plan by the aerial drone 101 to make the delivery or travel to the specified target location.

In step 1009, the drone configuration module 909 optionally deactivates at least one sensor of the aerial drone when a line of sight of the at least one sensor is calculated to include an interior of the at least one structure through the one or more privacy-sensitive features. For example, when a sensor may not be needed for navigation in a particular area and it is possible to deactivate a sensor without adversely affecting safety or an ability of the drone 101 to fly, then the drone configuration module 909 can deactivate the sensor. As previously noted, deactivation can also include reducing a field of view, sampling frequency, and/or other operational parameter of a sensor without shutting off the sensor entirely.

In another embodiment, e.g., when drone-to-infrastructure communications are available, the drone configuration module 909 transmits a signal from the aerial drone to at least one receiver of the at least one structure when a line of sight of the one or more sensors is calculated to expose an interior of the at least one structure through the one or more privacy-sensitive features. In one embodiment, the signal indicates to the at least one structure to take one or more automated privacy-preserving measures. In many cases, modern buildings and/or homes have advanced features that provide for automated operation (e.g., automated curtains/blinds, lighting, etc.). Accordingly, the privacy routing platform 107 can take advantage of these features when available, and provides for signaling between the drone 101 and buildings of interest to enhance privacy when a drone 101 flies by. This can include any automated feature (e.g., initiated without manual user intervention) such as turning off/on lights, closing/opening curtains, etc. As noted previously, a privacy preserving measure can include any action taken in response to a drone 101's signal that can obscure or block a line-of-sight between the drone 101 and an interior of a structure or building through a privacy-sensitive feature.

Figure 11:
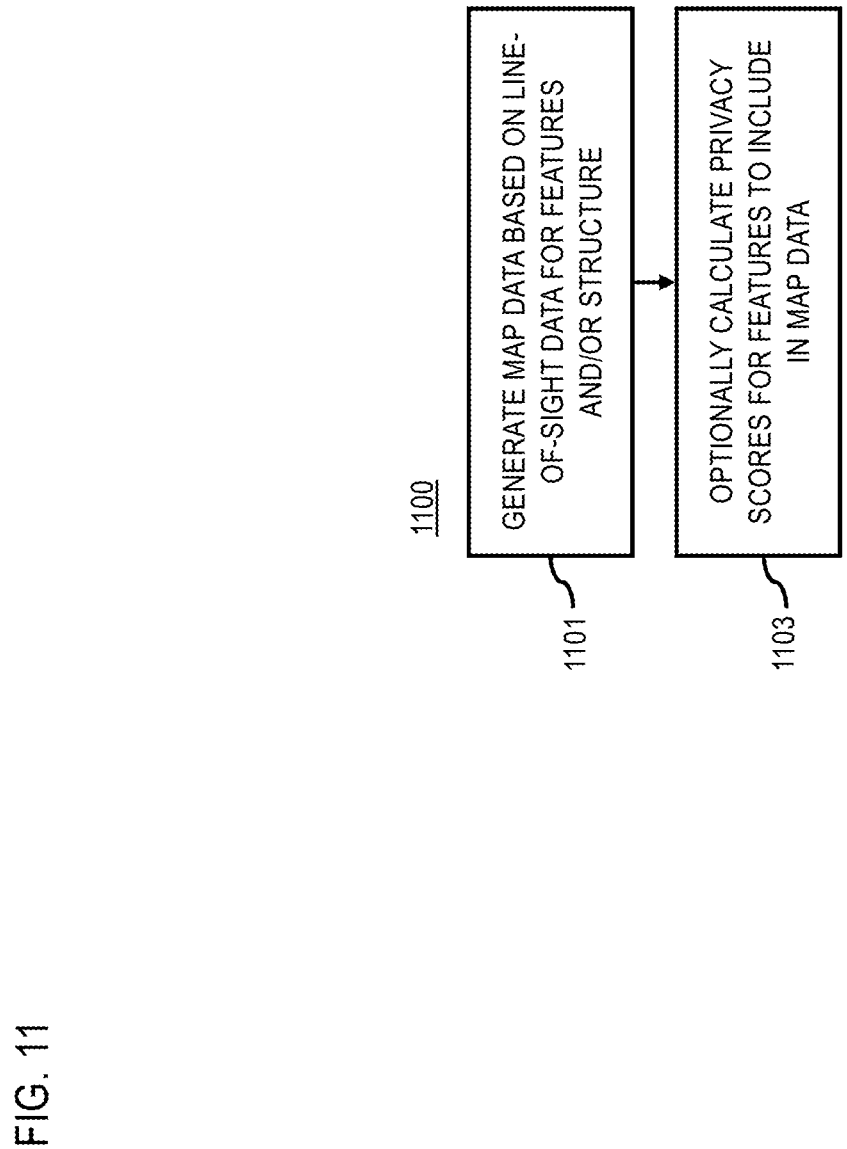
FIG. 11 is a flowchart of a process for mapping privacy-sensitive features of structures, and related light-of-sight and privacy data, according to one embodiment.

FIG. 11 is a flowchart of a process for mapping privacy-sensitive features of structures, and related light-of-sight and privacy data, according to one embodiment. In various embodiments, the privacy routing platform 107 and/or any of the modules 901-911 of the privacy routing platform 107 as shown in FIG. 9 may perform one or more portions of the process 1100 and may be implemented in, for instance, a chip set including a processor and a memory as shown in FIG. 15. As such, the privacy routing platform 107 and/or the modules 901-911 can provide means for accomplishing various parts of the process 1100, as well as means for accomplishing embodiments of other processes described herein in conjunction with other components of the system 100. Although the process 1100 is illustrated and described as a sequence of steps, its contemplated that various embodiments of the process 1100 may be performed in any order or combination and need not include all of the illustrated steps.

The process 1100 is an optional step that can be performed after line-of-sight data is calculated in the process 1000 of FIG. 10 described above. Accordingly, the process 1100 assumes that at least steps 1001-1005 have been performed. In one embodiment, the steps 1007 and 1009 of the process 1000 need not be performed in order to perform the process 1100.

In step 1101, the mapping module 911 generates map data of the line-of-sight data with respect to the one or more privacy-sensitive features, the at least one structure, or a combination thereof that has been calculated according to the process 1000 above. In one embodiment, the map data includes a mapping of three-dimensional locations surrounding the at least one structure above a street level. In other words, the mapping module 911 begins storing (e.g., in the privacy map data records 811 of the geographic database 105) the calculated line-of-sight data that that it can be used to create a map layer for later use or reuse in routing the drone 101. Creating this map layer includes, for instance, identifying locations in a 3D airspace surrounding the one or more buildings for which the line-of-sight data and/or field-of-view data is calculated, then creating a map indicating the possible of lines of sight from those locations. In another embodiment, only locations with lines of sight meeting predetermined criteria to be classified as a direct line of sight. For example, as discussed previously, a direct line of sight can be a line of sight with incident angles into an interior space through a private-sensitive feature (e.g., window, door, or other opening) greater than a threshold angle, or would create fields of view into the interior through the private-sensitive feature greater than an angular range.

In step 1103, the mapping module 911 optionally calculates respective privacy scores for the one or more privacy-sensitive features based on the line-of-sight data, the model data, indoor mapping data, or a combination thereof. The map data then further includes the respective privacy scores. As previously, the system 100 need not use a binary designation of private-sensitive versus non private sensitive classification of particular building features. Instead, a range of privacy values can be used to determine a privacy score for each feature (e.g., with higher scores indicating higher levels of privacy sensitivities). These privacy scores can be based on how direct or wide a field of view is into an interior space from a given location, properties of the interior space (e.g., specific room types, POI types, etc.) behind each feature, properties of the building, contextual properties (e.g., time, day, season, etc.), and/or any other similar property or characteristic of the drone 101 or location to which it is traveling or delivering a package.

In one embodiment, the routing of the drone 101 is further based on the map data. In other words, in addition to or in place of performing privacy and/or line-of-sight calculations for each individual package delivery or routing request, the privacy routing platform 107 can consult a map layer indicating the line-of-sight data that has been precomputed and/or stored (e.g., in the geographic database 105). In this way, the computational load associated with calculating a privacy-sensitive can be advantageously reduced by relying on mapping data instead of new calculations when responding to certain privacy routing requests (e.g., routing requests to previously routing delivery locations and/or delivery locations where privacy mapping data is available).

Figure 12:
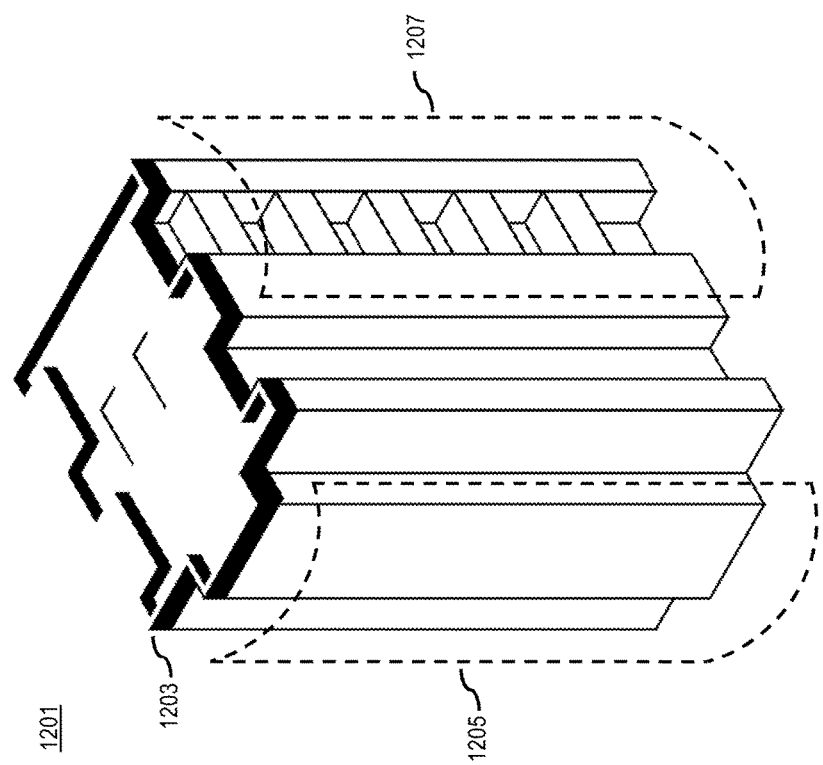
FIG. 12 is a diagram illustrating an example 3D privacy map for a building, according to one embodiment.

FIG. 12 is a diagram illustrating an example 3D privacy map for a building, according to one embodiment. As shown, a 3D privacy map 1201 is illustrated for the airspace surrounding a building 1203. More specifically, the 3D privacy map 1201 depicts the building 1203 and a visual representation of a first portion 1205 of the surrounding airspace and a second portion 1207 of the surrounding airspace with potential line-of-sight concerns for a drone (e.g., drone 101) traveling to or near the building 1203). For example, to determine the first portion 1205 and the second portion 1207, the privacy routing platform 107 identified window features of the building 1203 from model data. The privacy routing platform 107 then calculated potential lines of sights (e.g., visual lines of sight) from a sensor of a drone (e.g., camera mounted on a drone 101) to an interior of the building through the identified windows. In this example, any airspace location falling between the indicated first portion 1205 and the second portion 1207 and the exterior of the building are mapped to show that a direct line of sight would result from a drone 101 flying within that airspace. It is noted that the privacy map 1201 illustrates privacy sensitive airspace for just one building 1201 for simplicity, but it is contemplated that entire blocks, cities, and/or any other regional designation of buildings/structures can be similarly mapped and displayed in a similar manner.

Figure 13:
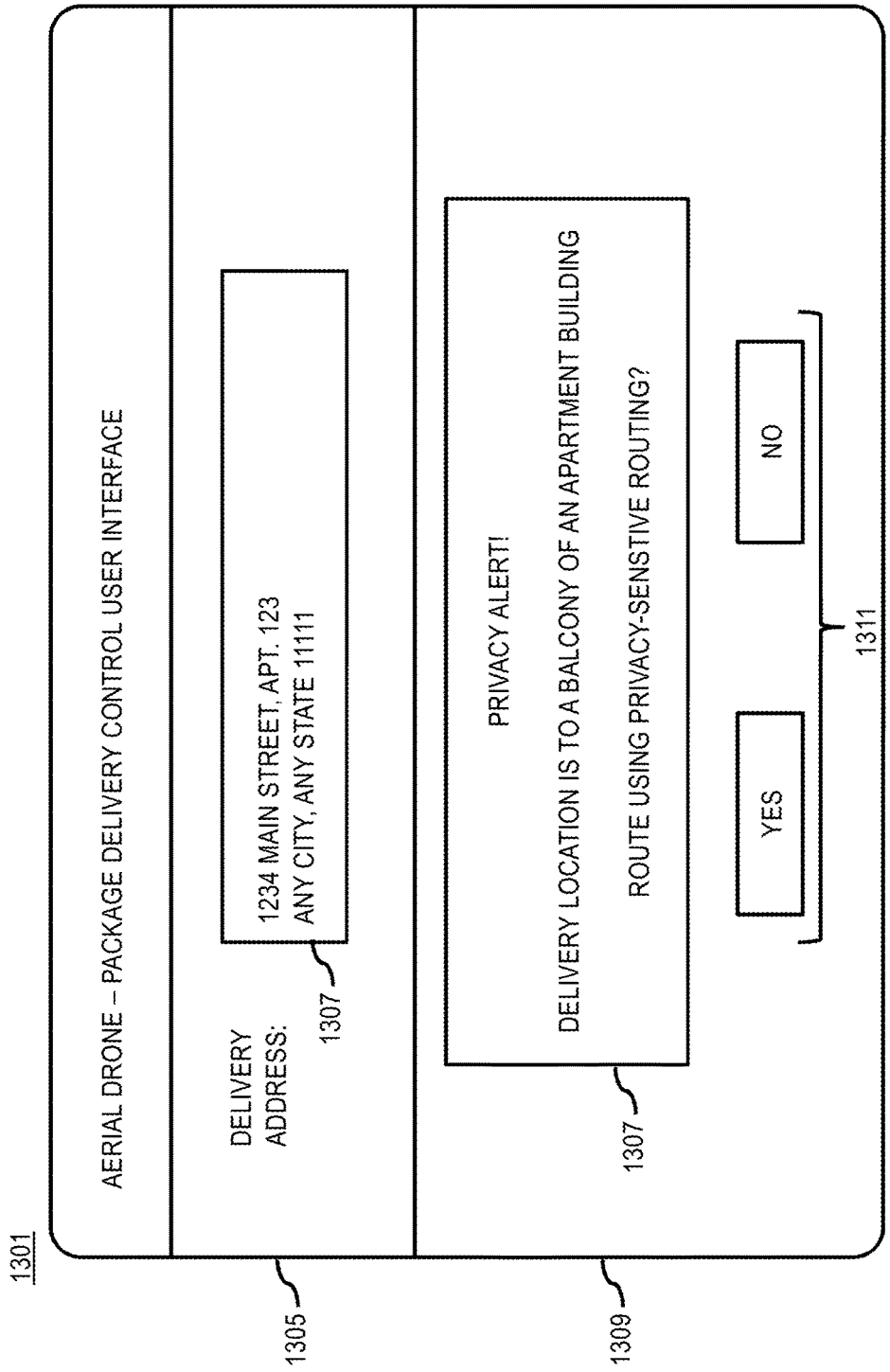
FIG. 13 is a diagram illustrating an example user interface for initiating privacy-sensitive routing for drone-based package delivery, according to one embodiment, according to one embodiment.

FIG. 13 is a diagram illustrating an example user interface for initiating privacy-sensitive routing for drone-based package delivery, according to one embodiment. As shown, a user interface (UI) 1301 provides a user interface element 1303 or window for entering a delivery location that is to receive a package by aerial drone delivery. On inputting an address 1305, the privacy routing platform 107 determines the type of building corresponding to the address and whether the building has any privacy-sensitive features. By way of example, the privacy routing platform 107 can consult a privacy map or calculate line-of-sight data for privacy-sensitive features (e.g., windows) of the target location to determine whether there are any potential privacy concerns. In this example, the privacy routing platform 107 determines that the target delivery is a balcony of an apartment building that has previously determined privacy-sensitive windows. Accordingly, the privacy routing platform 107 initiates presentation of an alert 1307 in a second user interface element 1309 of the UI 1301 to indicate the target delivery location is potentially privacy-sensitive and present a request to the drone operator or pilot of whether to "route using privacy-sensitive routing." The user interface element 1209 also includes a response option 1311 for the drone operator to indicate "yes" or "no" to initiate privacy-sensitive routing to the target delivery location according to the embodiments described herein.

The processes described herein for providing privacy-sensitive routing of an aerial drone may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
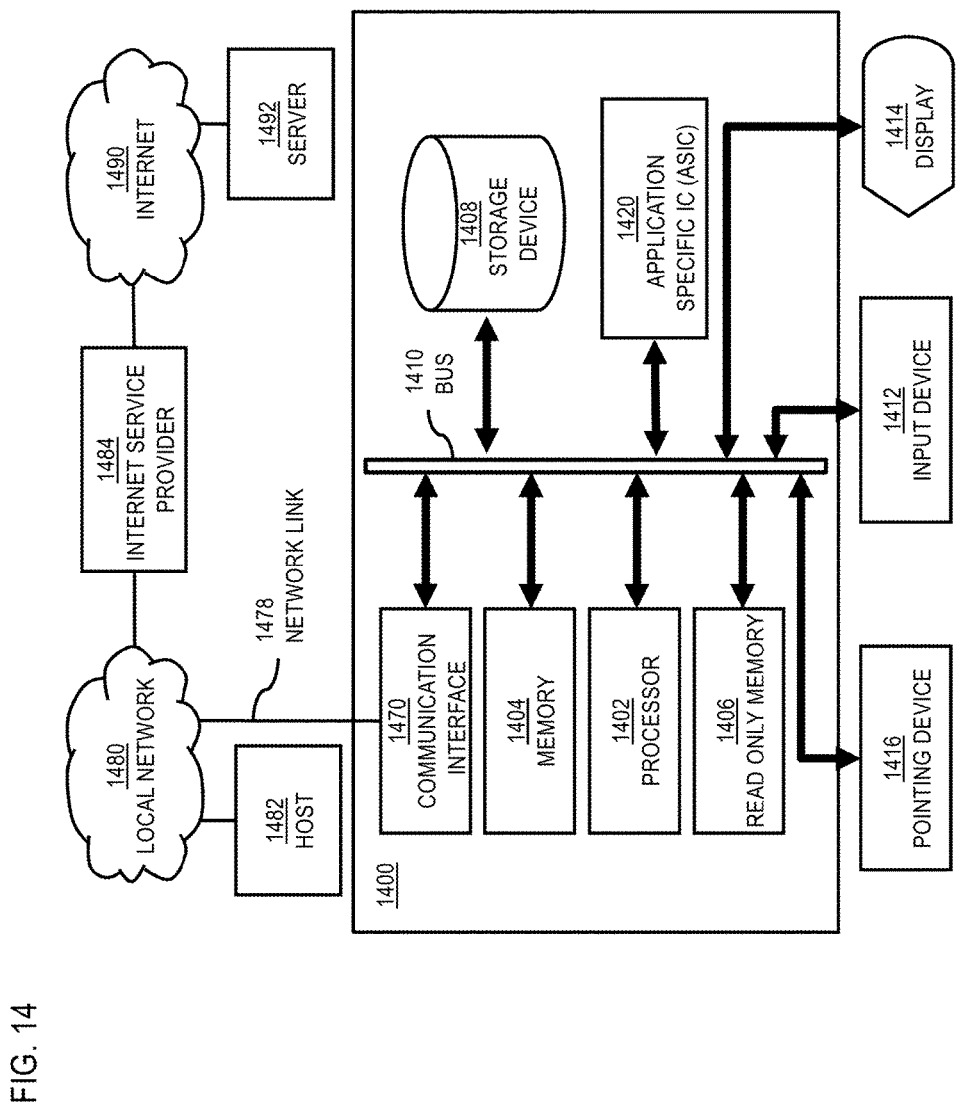
FIG. 14 is a diagram of hardware that can be used to implement an embodiment.

FIG. 14 illustrates a computer system 1400 upon which an embodiment of the invention may be implemented. Computer system 1400 is programmed (e.g., via computer program code or instructions) to provide privacy-sensitive routing of an aerial drone as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1410 includes one or more parallel conductors of information so that information is transferred quickly among devices coupled to the bus 1410. One or more processors 1402 for processing information are coupled with the bus 1410.

A processor 1402 performs a set of operations on information as specified by computer program code related to providing privacy-sensitive routing of an aerial drone. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random access memory (RAM) or other dynamic storage device, stores information including processor instructions for providing privacy-sensitive routing of an aerial drone. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for providing privacy-sensitive routing of an aerial drone, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT) or a liquid crystal display (LCD), or plasma screen or printer for presenting text or images, and a pointing device 1416, such as a mouse or a trackball or cursor direction keys, or motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414 and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 113 for providing privacy-sensitive routing of an aerial drone.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory 1404. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 15 illustrates a chip set 1500 upon which an embodiment of the invention may be implemented. Chip set 1500 is programmed to provide privacy-sensitive routing of an aerial drone as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to provide privacy-sensitive routing of an aerial drone. The memory 1505 also stores the data associated with or generated by the execution of the inventive steps.

Figure 16:
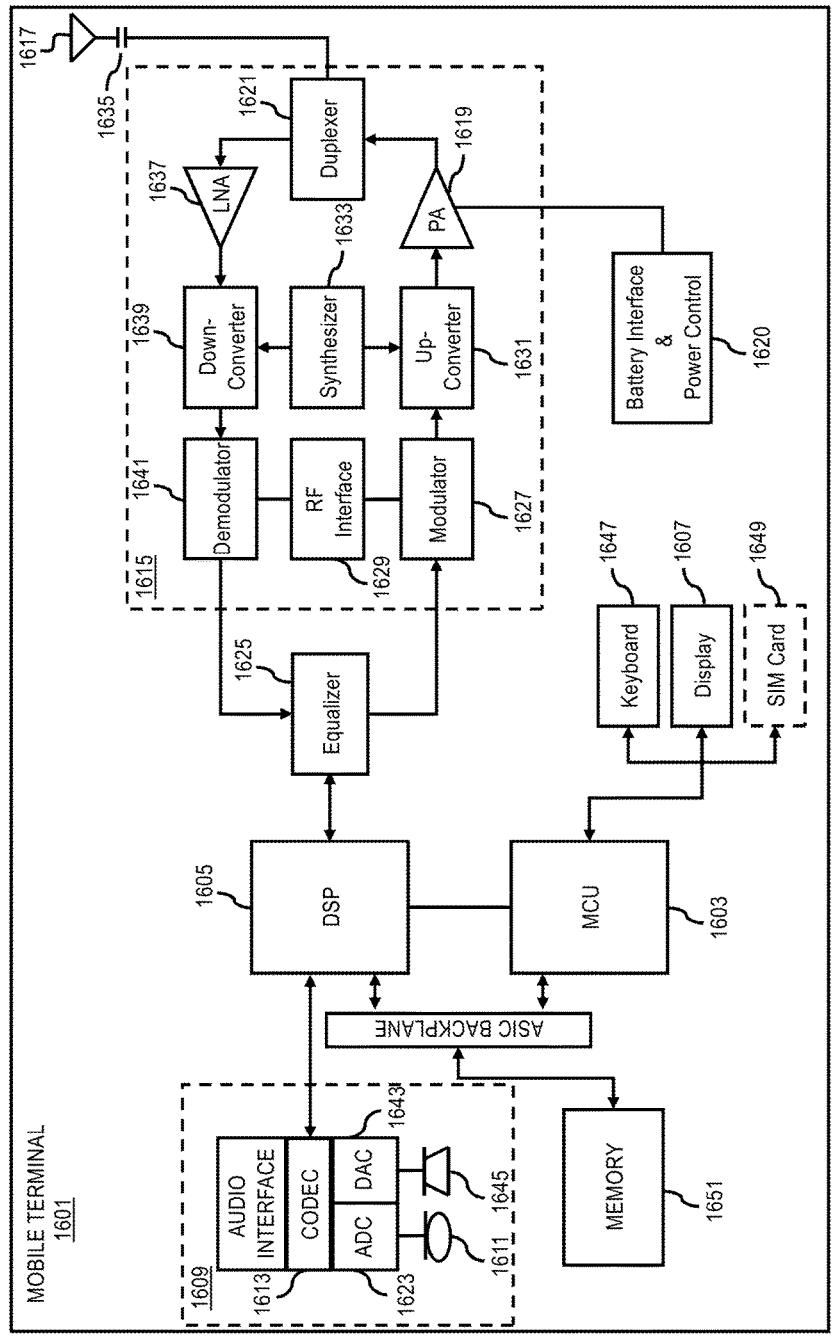
FIG. 16 is a diagram of a mobile terminal (e.g., handset) that can be used to implement an embodiment.

FIG. 16 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile station functions that offer automatic contact matching. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile station 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603—which can be implemented as a Central Processing Unit (CPU) (not shown).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile station 1601 to provide privacy-sensitive routing of an aerial drone. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the station. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile station 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1651 may be, but not limited to, a single memory, CD, DVD, ROM, RAM, EEPROM, optical storage, or any other non-volatile or non-transitory storage medium capable of storing digital data.

An optionally incorporated SIM card 1649 carries, for instance, important information, such as the cellular phone number, the carrier supplying service, subscription details, and security information. The SIM card 1649 serves primarily to identify the mobile station 1601 on a radio network. The card 1649 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    processing model data depicting at least one structure to determine one or more privacy-sensitive features of the at least one structure;
    calculating line-of-sight data between a route of an aerial drone and the one or more privacy-sensitive features, wherein the line-of-sight data is collected from one or more sensors; and
    configuring a routing of the aerial drone based on the line-of sight data, wherein the routing of the aerial drone is near the at least one structure.

2. The method of claim 1, wherein the one or more privacy-sensitive features include one or more windows, one or more openings, or a combination thereof of the at least one structure.

3. The method of claim 1, wherein the routing of the aerial drone is configured so that a direct line-of-sight between the aerial drone and an interior location of the at least one structure through the one or more privacy-sensitive features is avoided or minimized.

4. The method of claim 1, further comprising:
    matching the model data against indoor mapping data of the at least one structure,
    wherein the one or more privacy-sensitive features are further determined based on the matching.

5. The method of claim 1, further comprising:
    generating map data of the line-of-sight data with respect to the one or more privacy-sensitive features, the at least one structure, or a combination thereof,
    wherein the map data includes a mapping of three-dimensional locations surrounding the at least one structure above a street level.

6. The method of claim 5, further comprising:
    calculating respective privacy scores for the one or more privacy-sensitive features based on the line-of-sight data, the model data, indoor mapping data, or a combination thereof,
    wherein the map data further includes the respective privacy scores.

7. The method of claim 5, wherein the routing is further based on the map data.

8. The method of claim 1, wherein the line-of-sight data is based on a visual line of sight, a sensor-based line of sight, or a combination thereof.

9. The method of claim 1, wherein the configuring of the routing of the aerial drone comprises:
    generating a flight plan for the aerial drone to make a delivery to at least one location at or near the at least one structure, wherein the flight plan is based on the line-of-sight data; and
    initiating an execution of the flight plan by the aerial drone to make the delivery.

10. The method claim 1, wherein the flight plan for the aerial drone specifies an approach angle, a height of the aerial drone, a distance of the aerial drone from the one or more privacy-sensitive features, a location where the aerial drone is to rise, a location where the aerial drone is to descend, or a combination thereof.

11. The method of claim 1, further comprising:
    deactivating at least one sensor of the aerial drone when a line of sight of the at least one sensor is calculated to include an interior of the at least one structure through the one or more privacy-sensitive features.

12. The method of claim 1, further comprising:
    transmitting a signal from the aerial drone to at least one receiver of the at least one structure when a line of sight of the one or more sensors is calculated to expose an interior of the at least one structure through the one or more privacy-sensitive features,
    wherein the signal indicates to the at least one structure to take one or more automated privacy-preserving measures.

13. An apparatus comprising:
    at least one processor; and
    at least one memory including computer program code for one or more programs,
    the at least one memory and the computer program code configured to, with the at least one processor, cause the apparatus to perform at least the following:
        process model data depicting at least one structure to determine one or more privacy-sensitive features of the at least one structure;
        calculate line-of-sight data between a route of an aerial drone and the one or more privacy-sensitive features, wherein the line-of-sight data is collected from one or more sensors; and
        configure a routing of the aerial drone based on the line-of sight data, wherein the routing of the aerial drone is near the at least one structure.

14. The apparatus of claim 13, wherein the routing of the aerial drone is configured so that a direct line-of-sight between the aerial drone and an interior location of the at least one structure through the one or more privacy-sensitive features is avoided or minimized.

15. The apparatus of claim 13, wherein the apparatus is further caused to:
    match the model data against indoor mapping data of the at least one structure,
    wherein the one or more privacy-sensitive features are further determined based on the matching.

16. The apparatus of claim 13, wherein the apparatus is further caused to:
    generate map data of the line-of-sight data with respect to the one or more privacy-sensitive features, the at least one structure, or a combination thereof,
    wherein the map data includes a mapping of three-dimensional locations surrounding the at least one structure above a street level.

17. A non-transitory computer-readable storage medium, carrying one or more sequences of one or more instructions which, when executed by one or more processors, cause an apparatus to perform:

processing model data depicting at least one structure to determine one or more privacy-sensitive features of the at least one structure;

calculating line-of-sight data between a route of an aerial drone and the one or more privacy-sensitive features, wherein the line-of-sight data is collected from one or more sensors; and configuring a routing of the aerial drone based on the line-of sight data, wherein the routing of the aerial drone is near the at least one structure.

18. The non-transitory computer-readable storage medium of claim 17, wherein the routing of the aerial drone is configured so that a direct line-of-sight between the aerial drone and an interior location of the at least one structure through the one or more privacy-sensitive features is avoided or minimized.

19. The non-transitory computer-readable storage medium of claim 17, wherein the apparatus is further caused to perform:

matching the model data against indoor mapping data of the at least one structure, wherein the one or more privacy-sensitive features are further determined based on the matching.

20. The non-transitory computer-readable storage medium of claim 17, wherein the apparatus is further caused to perform:

generating map data of the line-of-sight data with respect to the one or more privacy-sensitive features, the at least one structure, or a combination thereof, wherein the map data includes a mapping of three-dimensional locations surrounding the at least one structure above a street level.

\* \* \* \* \*